US010373448B2

(12) United States Patent
El-Iraki et al.

(10) Patent No.: US 10,373,448 B2
(45) Date of Patent: Aug. 6, 2019

(54) APPARATUS AND SYSTEM FOR DETECTING EQUIPMENT OCCUPANCY

(71) Applicant: MYSEAT SAS, Cergy-Pontoise (FR)

(72) Inventors: Yahya El-Iraki, Montreal (CA); Pierre Baptiste Landoin, Paris (FR)

(73) Assignee: MYSEAT SAS, Cergy-Pontoise (FR)

( * ) Notice: Subject to any disclaimer, the term of this patent is extended or adjusted under 35 U.S.C. 154(b) by 0 days.

(21) Appl. No.: 15/540,936

(22) PCT Filed: Dec. 30, 2014

(86) PCT No.: PCT/IB2014/067425
§ 371 (c)(1),
(2) Date: Jun. 29, 2017

(87) PCT Pub. No.: WO2016/108072
PCT Pub. Date: Jul. 7, 2016

(65) Prior Publication Data
US 2017/0358182 A1    Dec. 14, 2017

(51) Int. Cl.
*G08B 5/22*        (2006.01)
*G08B 21/22*       (2006.01)
(Continued)

(52) U.S. Cl.
CPC ........... *G08B 5/221* (2013.01); *G06F 3/0481* (2013.01); *G08B 21/22* (2013.01); *G08B 29/185* (2013.01)

(58) Field of Classification Search
CPC ...... G08B 5/221; G08B 21/22; G08B 29/185; G06F 3/0481; G01P 15/0891; G01P 15/18; G01P 13/00
See application file for complete search history.

(56) References Cited

U.S. PATENT DOCUMENTS 6,049,281 A    4/2000 Osterweil
8,577,711 B2   11/2013 Korecki et al.
(Continued)

FOREIGN PATENT DOCUMENTS

EP    1941475 B1 *   3/2009   ............. G01P 13/00
FR    2983331 A1     5/2013
(Continued)

OTHER PUBLICATIONS

International Search Report—PCT/IB2014/067425, dated Oct. 13, 2015.
(Continued)

*Primary Examiner* — Adnan Aziz
(74) *Attorney, Agent, or Firm* — Norton Rose Fulbright Canada LLP (57) ABSTRACT

An apparatus (10) for detecting an occupancy of an equipment (12) by a person (14). A memory stores a status of the equipment as either occupied or unoccupied, and a predetermined acceleration limit value. An accelerometer unit communicates with the memory, and measures acceleration values of the equipment at discrete time intervals. The accelerometer unit compares each acceleration value to an acceleration limit value. If a consecutive number N of the acceleration values is greater than or equal to the acceleration limit value, the accelerometer unit generates a movement signal. A processor operates between an active mode when it receives the movement signal from the accelerometer unit, and an inactive mode. The processor in the active mode emits an occupied signal if the status of the equipment is unoccupied. A power source supplies electrical power to the accelerometer unit and to the processor.

20 Claims, 3 Drawing Sheets

(51) Int. Cl.
*G08B 29/18* (2006.01)
*G06F 3/0481* (2013.01)

(56) References Cited

U.S. PATENT DOCUMENTS

| | | | |
|---|---|---|---|
| 8,677,682 B2 | 3/2014 | Cote et al. | |
| 2009/0193217 A1 | 7/2009 | Korecki et al. | |
| 2009/0240463 A1 | 9/2009 | Lee et al. | |
| 2011/0050442 A1 | 3/2011 | Hefferon | |
| 2012/0056747 A1* | 3/2012 | Stadlthanner | A61B 5/1115 340/573.4 |
| 2012/0232742 A1 | 9/2012 | Elliot | |
| 2012/0232749 A1* | 9/2012 | Schoenberg | B60N 2/002 701/36 |
| 2012/0297226 A1* | 11/2012 | Mucignat | G06F 1/3203 713/323 |
| 2014/0091936 A1* | 4/2014 | O'Reilly | H05B 37/0227 340/669 |
| 2014/0313030 A1* | 10/2014 | Ten Kate | A61B 5/1115 340/539.12 |
| 2015/0175111 A1* | 6/2015 | Muramatsu | B60R 21/01516 702/150 |
| 2017/0068863 A1* | 3/2017 | Rattner | G06K 9/00838 |
| 2018/0055697 A1* | 3/2018 | Mihali | A61F 13/42 |

FOREIGN PATENT DOCUMENTS

| | | |
|---|---|---|
| GB | 2502974 A | 12/2013 |
| JP | H07244783 A | 9/1995 |
| JP | H08235451 A | 9/1996 |
| JP | 2004078272 A | 3/2004 |
| JP | 2005208720 A | 8/2005 |
| JP | 2006092267 A | 4/2006 |
| WO | 2013039518 A1 | 3/2013 |

OTHER PUBLICATIONS

Reduce your real estate costs by up to 20% and optimize your office environments, Herman Miller, Inc., 2010.
Japanese Office Action dated Oct. 1, 2018 for Application Serial No. 2017-553467 and English Translation.

* cited by examiner

APPARATUS AND SYSTEM FOR DETECTING EQUIPMENT OCCUPANCY

TECHNICAL FIELD

The application relates generally to detecting activity and, more particularly, to an apparatus, a system, and a method for detecting the occupancy of an equipment.

BACKGROUND OF THE ART

Managers of rooms, halls, and other shared places where people gather often wish to know the occupancy of these spaces (i.e. how many people are in the space). Occupancy is one metric used to evaluate the space, and whether there is a need to continue using it.

The oldest technique for measuring the occupancy of a space involves simply counting the people in that space at different periods. This technique is laborious, prone to error, difficult to repeat at odd hours of the day, and relatively costly.

In spaces equipped with work posts, such as call centers, the occupancy can be determined based on the presence, or lack thereof, of activity at each work post. In other words, if a computer at each work post is active, that is an indication that a person is present at that work post. This technique requires the presence of a computer connected to a network, and associated with a work post. This technique would therefore be ineffective with work posts or seats that do not have computers.

Another technique involves video surveillance of the space in question. This involves counting, manually or with the assistance of an electronic counter, all the people present within the camera's field of vision. It is generally difficult to include an entire space in the visual field of a camera. Furthermore, counters are relatively expensive and lack the precision and reliability required for certain applications.

Yet another technique involves a pressure sensor implanted in each seat. The pressure sensor detects a mass in each seat and thus is able to infer the presence of a person. Pressure sensors generally must be integrated into the seat during manufacturing. They are therefore difficult to use with existing seats, and with different types of seats. Furthermore, pressure sensors often generate false positives, cannot distinguish between people and inanimate objects, and wear down after repeated use.

SUMMARY

In one aspect, there is provided an apparatus for detecting an occupancy of an equipment by a person, the apparatus comprising: a memory having stored therein a status of the equipment as either occupied or unoccupied by the person, and a predetermined acceleration limit value; an accelerometer unit in communication with the memory, the accelerometer unit in operation, continuously measuring an acceleration value of the equipment at each of a plurality of discrete time intervals, the accelerometer unit accessing the acceleration limit value from the memory and comparing each acceleration value thereto, the accelerometer unit generating a movement signal indicative of a movement of the equipment upon a consecutive number N of the acceleration values being greater than or equal to the acceleration limit value; a processor in communication with the accelerometer unit and with the memory, the processor operable between an active mode upon receiving the movement signal from the accelerometer unit and an inactive mode, the processor in the active mode accessing the status of the equipment from the memory and emitting an occupied signal if the previous status of the equipment is unoccupied; and a power source supplying electrical power to the accelerometer unit and to the processor.

According to an embodiment, the processor is operable by default in the inactive mode.

According to an embodiment, the processor in the active mode accesses the status of the equipment from the memory and initiates a countdown if the status of the equipment is occupied, and then returns to the inactive mode. The processor enters the active mode and reinitiates the countdown upon receiving at least one movement signal before the countdown has reached zero, and then returns to the inactive mode. Or, the processor enters the active mode and emits an unoccupied signal if the processor does not receive another movement signal from the accelerometer unit for a duration greater than the countdown. Then the processor stores in the memory the status of the equipment as unoccupied upon emitting the unoccupied signal.

According to an embodiment, the countdown is between about 1 minute and about 30 minutes.

According to an embodiment, the accelerometer unit measures each acceleration value without communicating with the processor.

According to an embodiment, the processor stores in the memory the status of the equipment as occupied upon emitting the occupied signal.

According to an embodiment, the processor returns to the inactive mode upon emitting the occupied signal or the unoccupied signal.

According to an embodiment, the accelerometer unit measures at least one acceleration value having an absolute value greater than zero upon the person sitting on, or getting up from, the equipment.

According to an embodiment, the processor enters the active mode and accesses the status of the equipment from the memory, the processor initiating a test countdown if the status of the equipment is unoccupied and returning to the inactive mode, the processor emitting an occupied signal if the processor receives another movement signal from the accelerometer unit for a duration less than the test countdown.

According to an embodiment, the processor enters the active mode and accesses the status of the equipment from the memory, the processor initiating a test countdown if the status of the equipment is occupied and returning to the inactive mode, the processor emitting an unoccupied signal if the processor does not receive another movement signal from the accelerometer unit for a duration greater than the test countdown.

According to an embodiment, the accelerometer unit measures the acceleration values at a frequency between about 1 Hz and about 5,000 Hz. The predetermined acceleration limit value is between about $1\times10^{-3}$ and about $2\times10^{-2}$ fraction of g (9.81 m/s$^2$) after discarding the acceleration due to gravity. The consecutive number N of the acceleration values is between about 1 and about 300.

According to an embodiment, there is provided a body housing at least one of the memory, the accelerometer unit, the processor and the power source, the body being mountable to the equipment.

In another aspect, there is provided a system for detecting an occupancy of a plurality of equipment by people, comprising: at least one apparatus each mountable to a corresponding equipment, comprising: a memory having stored therein a status of said equipment as either occupied or unoccupied by a person, and a predetermined acceleration limit value; an accelerometer unit in operation measuring an acceleration value of said equipment at each of a plurality of discrete time intervals, the accelerometer unit accessing the acceleration limit value from the memory and comparing each acceleration value thereto, the accelerometer unit continuously measuring acceleration and generating a movement signal indicative of a movement of said equipment upon a consecutive number N of the acceleration values being greater than or equal to the acceleration limit value; a processor in communication with the accelerometer unit and with the memory, the processor operable between an active mode upon receiving the movement signal from the accelerometer unit and an inactive mode, the processor in the active mode accessing the status of said equipment from the memory and emitting an occupied signal if the status of said equipment is unoccupied; and a power source supplying electrical power to the accelerometer unit and to the processor; a system memory having stored therein the status of each of the equipment as either occupied or unoccupied by a corresponding person; a system processor in communication with each apparatus to receive the occupied signal and an unoccupied signal therefrom; and at least one application stored in the system memory, and executable by the system processor to: receive the occupied and unoccupied signals from each apparatus; modify the system memory to change the status of each of the equipment as a result of the occupied or unoccupied signal received from a corresponding apparatus; and output equipment occupancy data indicative of the changed status of each of the equipment stored in the modified system memory.

According to an embodiment, the equipment occupancy data is a graphical representation of the changed status of each of the equipment.

According to an embodiment, there is an output device in communication with the system processor, the output device displaying the graphical representation of the changed status of each of the equipment.

According to an embodiment, the processor is operable by default in the inactive mode.

According to an embodiment, the processor in the active mode accesses the status of said equipment from the memory and initiates a countdown if the status of said equipment is occupied, and the returns to the inactive mode.

According to an embodiment, the processor enters the active mode and reinitiates the countdown upon receiving at least one movement signal before the countdown has reached zero, and then returns to the inactive mode.

According to an embodiment, the processor emits an unoccupied signal if the processor does not receive another movement signal from the accelerometer unit for a duration greater than the countdown.

According to an embodiment, the processor stores in the memory the status of said equipment as unoccupied upon emitting the unoccupied signal.

According to an embodiment, the accelerometer unit measures each acceleration value without communicating with the processor.

According to an embodiment, the processor stores in the memory the status of said equipment as occupied upon emitting the occupied signal.

According to an embodiment, the processor returns to the inactive mode upon emitting the occupied signal or the unoccupied signal.

According to an embodiment, the processor enters the active mode and accesses the status of said equipment from the memory, the processor initiating a test countdown if the status of said equipment is occupied and returning to the inactive mode, the processor emitting an unoccupied signal if the processor does not receive another movement signal from the accelerometer unit for a duration greater than the test countdown.

In yet another aspect, there is provided a method for detecting an occupancy of an equipment by a person, comprising: measuring an acceleration of at least a part of the equipment at each of a plurality of discrete time intervals with an accelerometer unit; comparing in the accelerometer unit the measured accelerations to a predetermined acceleration limit value; emitting a movement signal with the accelerometer unit to a processor upon a consecutive number N of the measured accelerations being greater than or equal to the acceleration limit value; and exiting the processor from an inactive mode upon receiving the movement signal and emitting an occupied signal with the processor if a current status of the equipment is unoccupied.

According to an embodiment, exiting the processor from the inactive mode includes initiating a countdown if the current status of the equipment is occupied, and returning to the inactive mode.

According to an embodiment, exiting the processor from the inactive mode includes reinitiating the countdown upon receiving at least one movement signal before the countdown has reached zero.

According to an embodiment, initiating the countdown includes emitting an unoccupied signal with the processor if the processor does not receive another movement signal from the accelerometer unit for a duration greater than the countdown, and returning to the inactive mode.

According to an embodiment, emitting the unoccupied signal includes changing the status of the equipment to unoccupied.

According to an embodiment, measuring the acceleration includes measuring the acceleration without communicating with the processor.

According to an embodiment, exiting the processor from the inactive mode includes changing the status of the equipment to occupied.

DESCRIPTION OF THE DRAWINGS

Reference is now made to the accompanying figures in which.

DETAILED DESCRIPTION

Figure 1A:
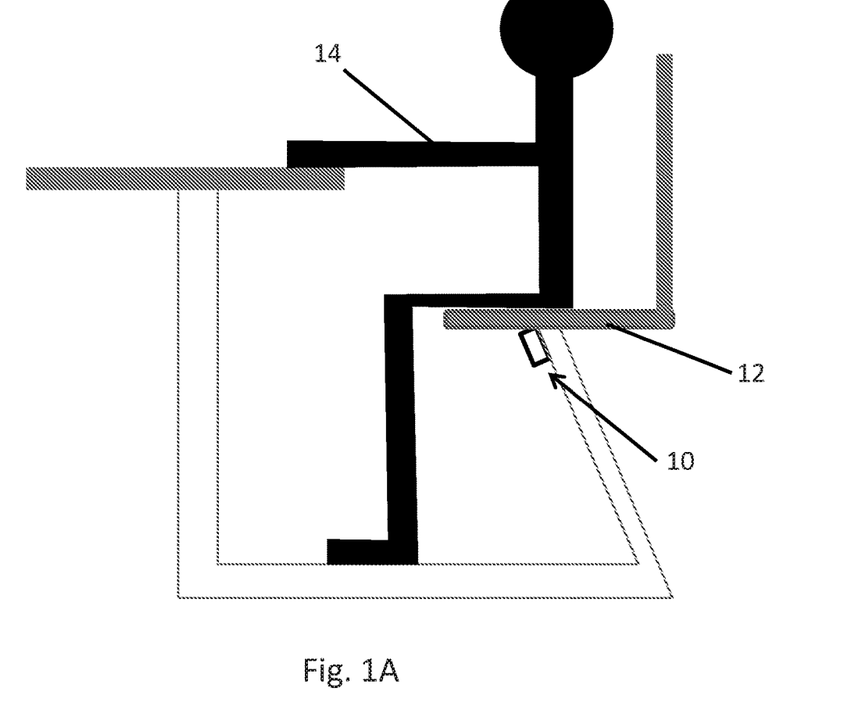
FIG. 1A is a schematic side elevation view of an apparatus mounted to an equipment occupied by a person, according to an embodiment of the present disclosure.
Figure 1B:
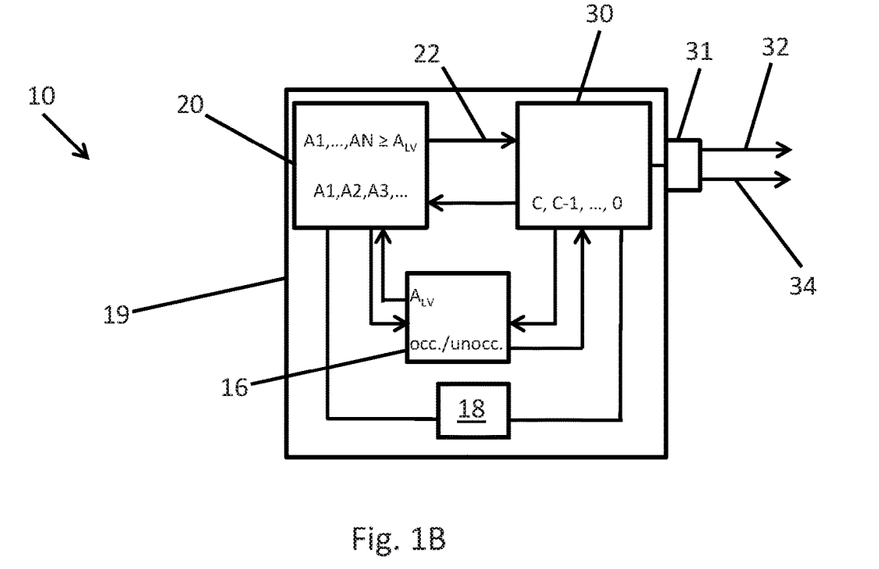
FIG. 1B is an enlarged view of the apparatus of FIG. 1A.

FIGS. 1A-1B illustrate schematically an apparatus 10 for detecting the occupancy of an equipment 12 by a person 14 sitting therein. In so doing, the apparatus 10 is able to provide data about whether the equipment 12 is occupied at any given moment, and for what period of time. This information can then be used, remotely if desired, to assess whether that resource is being properly used, or whether it should be deployed to another location. When multiple apparatuses 10 are each attached to multiple pieces of equipment 12 in a room, the data provided by the apparatuses 10 helps to determine the occupancy of the room itself.

As used herein, the term "occupancy" and its derivatives refers to the state or fact of being present in the resource being analysed. For example, if the resource is the equipment 12, the term "occupancy" and its derivatives refers to the presence, or lack thereof, of the person 14 in the equipment 12. As another example, if the resource is a room having multiple pieces of equipment 12, the term "occupancy" and its derivatives refers to the presence, or lack thereof, of people 14 in the equipment 12, such that the overall presence of people 14 in the room can be determined.

While the present disclosure refers to a person 14 occupying the equipment 12, it will be appreciated that the occupancy of the equipment 12 by any other object, whether motile or inanimate, is also within the scope of the present disclosure. Some non-limiting examples of such objects include animals, bags or backpacks, and equipment. The present disclosure is therefore not limited to measuring the occupancy of people 14 in equipment 12. Similarly, although shown to be a seat in FIG. 1A and described as such through the disclosure, the equipment 12 is not limited to seats, or to any object used to at least partially support the weight of the person 14. The equipment 12 can therefore be any object in which it is desired to know or determine its use or occupancy. Some non-limiting examples of types of equipment 12 include stools, sofas, sporting/exercise equipment, armchairs, benches, treadmills, and the like. In addition, the room in which one or more of the apparatuses 10 are placed can be any suitable space, such as an office, a conference room or hall, a restaurant, a café, a gym, a library, and other similar shared working or leisure spaces.

The apparatus 10 is generally mounted to, and removable from, any part of the equipment 12. Although shown in FIG. 1A as being mounted at the junction of the base of the equipment 12 and its seat post, the apparatus 10 can be mounted to other locations such as the floor support, the desk, or the backing of the equipment 12. The apparatus 10 can be mounted to the equipment 12 using any suitable technique, including tie wrap or cable tie, adhesive, a mechanical fastener, or adhesive tape. The apparatus 10 may be mounted to the equipment 12 such that there is no relative movement between them, although this is not required. This can be achieved by encasing one or more of the components in a casing or body 19, and then mounting the body 19 to the equipment 12. The movement of the equipment 12 can therefore be transmitted to the apparatus 10, helping to ensure that the movements experienced by the equipment 12 when occupied by the person 14 are transmitted directly to the apparatus 10. The apparatus 10 may also be made integral with the equipment 12. This may be the case where the apparatus 10 is incorporated into the equipment 12 during the manufacturing of the equipment 12.

Referring to FIGS. 1A and 1B, the apparatus 10 is an electronic computing device. As such, it has a memory 16 for storing data about a status of the equipment 12, a power source 18 for supplying energy to the apparatus 10, an accelerometer unit 20 which measures the acceleration of the equipment 12, and a processor 30 which emits signals indicative of the occupancy of the equipment 12.

The memory 16 stores a status of the equipment 12 as either occupied or unoccupied by the person 14. An occupied status indicates that the person 14 is currently, or was very recently, present in the equipment 12. An unoccupied status indicates that the person 14 has left the equipment 12 and that it is empty.

The memory 16 also stores a predetermined acceleration limit value $A_{LV}$. The acceleration limit value $A_{LV}$ is an acceleration value (i.e. an absolute rate of change in the velocity of the equipment) that has been programmed into the memory 16 before the apparatus 10 is used to detect occupancy. It is a magnitude of the acceleration of the equipment 12 that might affect its occupancy status. The selected acceleration limit value $A_{LV}$ can vary depending on the following non-limiting factors: the nature or type of the equipment 12, the location of the apparatus 20 on the equipment 12, the stiffness or resiliency of the material composing the equipment 12, and/or the amount of equipment movement expected to occur. The acceleration limit value $A_{LV}$ can be a multiple of the smallest acceleration magnitude detectable by the accelerometer unit 20. Alternatively, it can be a multiple of the constant acceleration due to gravity (i.e. 9.81 m/s$^2$). More particularly, the acceleration limit value $A_{LV}$ can be between about $1\times10^{-3}$ and about $2\times10^{-2}$ the acceleration due to gravity, and net of the effect of gravity. The fact that the acceleration limit value $A_{LV}$ is set independent of the normal acceleration due to gravity allows the apparatus 10 to be oriented in any position. As will be discussed in greater detail below, the acceleration limit value $A_{LV}$ determines when the accelerometer unit 20 signals the processor 30 that a meaningful movement of the equipment 12 has occurred.

The memory 16 communicates with, and is accessible by, both the processor 30 and the accelerometer unit 20. One example of such communication is that the status of the equipment 12 can be rewritten by the processor 30. As such, the memory 16 can be an internal component of either one or both of the accelerometer unit 20 and the processor 30, or separate external memory thereto. The memory 16 may be a main memory, such as a high speed Random Access Memory (RAM). The memory may be any other type of memory, such as an optical storage media, and an Erasable Programmable Read-Only Memory (EPROM).

The power source 18 provides electrical energy to the apparatus 10 generally, and to the accelerometer unit 20 and the processor 30 more particularly. The apparatus 10 is typically, but not exclusively, a wireless device. As such, the power source 18 is a portable power source 18, and may be a battery such as lead acid, nickel cadmium, nickel metal hybrid, lithium polymer, lithium ion, or any other type of suitable battery.

Still referring to FIGS. 1A and 1B, the accelerometer unit 20 continually measures the acceleration, and thus the movement, of the equipment 12 in response to a movement of the person 14 therein. The movements of the person 14 include conventional movements such as sitting on the equipment 12 and lifting up therefrom. The movements of the person 14 also include other movements, such as coughing, shifting position, laughing, speaking, sliding in the equipment 12, etc. Therefore, any jolt, vibration, compression, extension, or other similar movement of the equipment 12, of most magnitudes, will be measured by the accelerometer unit 20.

The accelerometer unit 20 can also distinguish between equipment movements that can be ignored, and equipment movements that affect the occupancy of the equipment 12. The acceleration of the equipment 12 is measured by the accelerometer unit 20 along any or all of the three axes of motion because movement along any one of the axes may be indicative of the occupancy of the equipment 12. The accelerometer unit 20 can be a microelectromechanical system (MEMS) or device. The accelerometer unit 20 communicates with the memory 16, and may also be in communication with the processor 30 to receive instructions therefrom.

When the apparatus 10 is being used, the accelerometer unit 20 measures a separate acceleration value A (shown as A1, A2, A3, . . . in FIG. 1B) of the equipment 12 at each of a plurality of discrete time intervals. The accelerometer unit 20 may measure the acceleration values A without communicating with the processor 30. Each acceleration value A is a measurement of the rate of change in speed of the equipment 12 at each time interval, usually expressed as an absolute number. For most applications, but not necessarily all, only the magnitude of the acceleration value A is useful. The vector components of each acceleration value A along the three axes of motion are generally not used by the apparatus 10. For example, when the equipment 12 is unoccupied, the acceleration value A will likely have a magnitude of zero for each of the time intervals during which the equipment 12 remains empty. When the person 14 sits in, or gets up from, the equipment 12, the accelerometer unit 20 may measure at least one acceleration value A having a magnitude or absolute value greater than zero, along any one of the three axes of motion.

The time intervals are the periods of time separated by the measurement of the acceleration values A. They can either be constant time intervals, irregular time intervals, random time intervals, or any combination of these. They are generally a function of the frequency at which the accelerometer unit 20 measures the acceleration values A. This frequency can vary, and can depend upon any one of the following non-limiting factors: the type of equipment 12 being used, the duration of the power source 18, and the desired amount of data reliability. In an embodiment, the frequency is between about 50 Hz to about 5,000 Hz. Considering for example a frequency of 50 Hz. It follows that the accelerometer unit 20 will measure an acceleration value A every 0.02 seconds, which is the duration of each time interval as well.

The accelerometer unit 20 communicates with the memory 16 to access the acceleration limit value $A_{LV}$. The accelerometer unit 20 compares the acceleration values A to the acceleration limit value $A_{LV}$. This can be done locally within the accelerometer unit 20. It therefore may not involve the processor 30. If a consecutive number N of the acceleration values A is greater than, or equal to, the acceleration limit value $A_{LV}$, the accelerometer unit 20 will generate a movement signal 22. The consecutive number N of acceleration values A can vary. It is typically dependent on any one of the following non-limiting factors: the type of equipment 12 being used, the age or characteristics of the person 14 intended to occupy the equipment 12, the duration of the power source 18, and the desired amount of data reliability. In an embodiment, the consecutive number N of acceleration values A is between about 1 and about 300.

The movement signal 22 is indicative of a meaningful movement of the equipment 12, and is emitted to the processor 30. The movement signal 22 is only generated when each one of the consecutive number N of acceleration values N exceeds, or is equal to, the acceleration limit value $A_{LV}$. The movement signal 22 therefore indicates that multiple acceleration values A, one following the other in succession, exceed or are equal to the acceleration limit value $A_{LV}$, which helps to eliminate false positives which purport to indicate a meaningful movement of the equipment 12. After sending the movement signal 22, the accelerometer unit 20 returns to measuring the acceleration values A. It will generate another movement signal 22 if the consecutive number N of acceleration values N again exceeds, or is equal to, the acceleration limit value $A_{LV}$.

In light of the preceding, it will be appreciated that the accelerometer unit 20 can itself have a processor to perform some or all of the functionality ascribed thereto (e.g. communicating with the memory 16, comparing the acceleration values A to the acceleration limit value $A_{LV}$, etc.). The processor of the accelerometer unit 20 may be independent of a sensing component which is responsible for measuring the acceleration values A.

Still referring to FIGS. 1A and 1B, the processor 30 processes the movement signal 22 received from the accelerometer unit 20, and is thus in communication therewith. The processor 30 is also in communication with the memory 16, and can thus determine whether the movement signal 22 affects the occupancy of the equipment 12. As such, it can be appreciated that the processor 30 can be integral with the accelerometer unit 20 and with the memory 16, or can alternatively be a separate component. The processor 30 may therefore be any device that can perform operations on data. Examples are a microcontroller, a central processing unit (CPU), a front-end processor, a microprocessor, a graphics processing unit (GPU/VPU), a physics processing unit (PPU), a digital signal processor, and a network processor.

The processor 30 operates between an inactive mode and an active mode. The inactive mode is an operating state of the processor 30 during which it consumes a negligent amount of energy from the power source 18. In the inactive mode, the processor 30 is essentially dormant or sleeping, such that it does not communicate with any device outside of the apparatus 10. The default mode of operation of the processor 30 is the inactive mode because the processor 30 is inactive most of the time that the apparatus 10 is in use. For example, the processor 30 will be in the inactive mode while the equipment 12 is unoccupied. The processor 30 will also be in the inactive mode the majority of the time that the equipment 12 is occupied by the person 14. It can thus be appreciated that, in some instances, the processor 30 is in the inactive mode about 99% of the time that the apparatus 10 is in use.

The processor 30 therefore consumes very little power from the power source 18 during the operation of the apparatus 10. Consider that the accelerometer unit 20 may measure the acceleration values A without communicating with the processor 30. The acceleration values A are therefore not communicated to, analysed, or stored in the processor 30. Indeed, the processor 30 is only advised, via the movement signal 22, when meaningful movement of the equipment 12 occurs. This allows the processor 30 to have shorter execution cycles, and thus further reduces its power consumption. The processor 30 can therefore remain inactive while the accelerometer unit 20 continues to measure the acceleration values A.

Since the processor 30 is far and away the most power-hungry component of the apparatus 10, it can be appreciated that the apparatus 10 itself will therefore use very little power. This greatly increases the longevity of the apparatus 10, and thus its attractiveness for users. The greater longevity of the apparatus 10 allows it to remain in operation for considerable periods of time, by some estimates as long as five years or more, before the power source 18 needs to be replaced. The processor 30 will remain in the inactive mode until it receives a movement signal 22 from the accelerometer unit 20, at which point it will enter the active mode.

In the active mode, the processor 30 executes its functions. More particularly, the processor 30 queries or accesses the memory 16 after receiving the movement signal 22. The processor 30 obtains the status of the equipment 12 from the memory 16. The processor 30 is therefore aware of whether the equipment 12 is occupied by the person 14, or not. If the memory 16 indicates to the processor 30 that status of the equipment 12 is unoccupied, the processor 30 will emit an occupied signal 32. The emission of the occupied signal 32 is generally performed with a transmitting unit, such as an antenna or transceiver 31, to a remote server or network. The occupied signal 32 indicates that the person 14 is occupying the equipment 12.

In light of the preceding, it can thus be appreciated that the apparatus 10 may operate as follows. Still referring to FIGS. 1A to 1B, the predetermined acceleration limit value $A_{LV}$ is stored into the memory 16. Similarly, the status of the equipment 12 as occupied or unoccupied is either known from previous uses of the apparatus 10 with the equipment 12 in question, or it is programmed into the memory 16. The apparatus 10 may then be mounted to the equipment 10 put to use.

The apparatus 10 is typically mounted to the equipment 12 when it is unoccupied. The status of the equipment 12 will therefore be unoccupied in the memory 16, and the processor 30 will be in the inactive mode. The accelerometer unit 20 begins to measure acceleration values A. When the person 14 sits in the equipment 12, a consecutive number N of the acceleration values A will each have a magnitude greater than the acceleration limit value $A_{LV}$. The accelerometer unit 20 will therefore generate the movement signal 20 to the processor 30. The processor 30 will exit the inactive mode and enter the active mode. It will then query the memory 16 and discover that the status of the equipment 12 is currently unoccupied. The movement signal 22 therefore indicates that the person 14 is in the equipment 12, and that the equipment 12 is occupied. The processor 30 therefore emits the occupied signal 32 from the transceiver 31. In order to accurately reflect the new status of the equipment 12, the processor 30 may also store in the memory 16 the new status of the equipment 12 as being occupied, once it has emitted the occupied signal 32. The processor 30 may then return to the inactive mode.

The equipment 12 is now occupied, the memory 16 accurately reflects this status, and the processor 30 has returned to the inactive mode. The processor 30 may now perform a series of other operations, or it can remain in the inactive mode, upon receiving another movement signal 22. At least some of the ways this can occur are now described.

If the processor 30 receives another movement signal 22, and the status of the equipment 12 is indicated in the memory 16 as being occupied, this additional movement signal 22 may be indicative of the person 14 previously occupying the equipment 12 now leaving it. In lifting up from the equipment 12, the person 14 will cause the equipment 12 to move. The movement of the equipment 12 will in turn cause the accelerometer unit 20 to measure a consecutive number N of acceleration values A, each of which has a magnitude that exceeds the acceleration limit value $A_{LV}$. This will then cause the accelerometer unit 20 to generate the additional movement signal 22.

It may be necessary to verify if the additional movement signal 22 is truly indicative of the person 14 leaving the equipment 12, and to therefore determine if the status of the equipment 12 should be changed to unoccupied. The processor 30, upon receiving the additional movement signal 22 from the accelerometer unit 20, will therefore enter the active mode and initiate a countdown C. The countdown C is a period of time, typically measured in seconds or minutes, during which the processor 30 will count downwards towards zero. The countdown C generally corresponds to the maximum amount of time that the person 14 can remain absolutely motionless. This is about 2 to 3 minutes for the average person 14. However, the countdown C can be longer or shorter than this duration, and can be between about 1 minute and about 30 minutes. After initiating the countdown C, the processor 30 will return to the inactive mode.

The countdown C will start counting backwards towards zero. If the accelerometer unit 20 does not generate yet another movement signal 22 for a duration greater than the countdown C, the processor 30 will emit an unoccupied signal 34 via the transceiver 31. The absence of the movement signal 22 from the accelerometer unit 20 following the one that triggered the countdown C indicates that there is no meaningful movement in the equipment 14. There is therefore likely no person 14 present in the equipment 12, and the processor 30 can therefore reliably emit the unoccupied signal 34. The processor 30 may also store in the memory 16 the new status of the equipment 12 as being unoccupied once it has emitted the unoccupied signal 34. The processor 30 may then, once again, return to the inactive mode.

In some instances, and still referring to FIGS. 1A and 1B, the receipt of an another movement signal 22 by the processor 30 when the equipment 12 is occupied is not an indication of a change in the status of the equipment 12. It may occur that the person 14 fidgets, shifts, or otherwise moves in the equipment 12, thereby causing one or more movement signals 22 to be generated by the accelerometer unit 20. These movement signals 22 are not indicative of a change in the status of the equipment 12 to being unoccupied, because the person 14 still remains in the equipment 12.

Consider for example a student 14 arriving in a lecture hall just before the lecture starts. Many of the actions of the student 14 during this period of time will generate movement signals 22. For example, the student 14 sitting down in an empty chair 12 will generate a movement signal 22, and change the status of the chair 12 to being occupied. If the student 14 then gets up to remove her jacket and sits back down, that will generate two additional movement signals 22. If the student 14 then turns to talk to a neighbour, that may also generate one or more movement signals 22. None of these movement signals 22, generated over a relatively short period of time, are indicative of the student 14 leaving her chair 12.

In order to avoid these movement signals 22 generating false positives, the processor 30 may become non responsive to these movement signals 22 by reinitiating the countdown C each time one is received before the countdown C has reached zero. Consider the preceding example. The student 14 sits down in the empty chair 12 thereby generating a movement signal 22 and changing the status of the chair 12 to being occupied. When the student 14 then gets up to remove her jacket, this will generate another movement signal 22 and trigger the countdown C to begin. When she sits back down very quickly after getting up, she will generate another movement signal 22 which will interrupt the countdown C and cause it to reinitiate or reset. Similarly, when the student 14 then turns to talk to her neighbour, she will generate one or more movement signals 22, each one of which will reinitiate the countdown C. The processor 30 will continue to reinitiate the countdown C every time it is interrupted by a movement signal 22 before it has counted down to zero. When the countdown C eventually reaches zero, it will because no movement signal 22 has interrupted it. This will likely be an indication that the equipment 12 is empty, and the processor 30 will then emit the unoccupied signal 34. The processor enters the active mode each time it reinitiates the countdown C, and then quickly returns to the inactive mode after having reinitiated the countdown C.

Since these movement signals 22 are indicative of the person 14 moving in the equipment 12 rather than a change in its status, the processor 30 can essentially ignore them by remaining in the inactive mode most of the time. This helps to further reduce the power consumption of the processor 30, and improve the reliability of the occupancy data generated by the apparatus 10. Alternatively, these movement signals 22 may be indicative of a first person 14 leaving the equipment 12 and a second person 14 taking the place of the first person 14 over a short period of time. In this instance, the status of the equipment 12 has essentially not changed from being occupied.

If no movement signal 22 is generated after the status of the equipment 12 has changed to occupied, it may be an indication that an inanimate object is present in the equipment 12 (e.g. a school bag). In such a case, it may be desirable to change the status of the equipment 12 to unoccupied, so that a person 14 can then move the inanimate object and occupy that equipment 12. The processor 30 may therefore exit the inactive mode, and enter the active mode. The processor 30 may then query the memory 16. If the memory 16 indicates that the status of the equipment 12 is occupied, the processor 30 will initiate a test countdown. The test countdown is a length of time, typically measured in seconds or minutes, during which the processor 30 counts towards zero to "test" if the equipment 12 experiences movement. If the processor 30 does not receive a movement signal 22 from the accelerometer unit 20 for a period of time greater than the test countdown, it is probable that the equipment 12 is occupied by an immobile object. The processor 30 will therefore emit the unoccupied signal 34, and return to the inactive mode. The processor 30 may also store in the memory 16 the status of the equipment 12 as being unoccupied. In this way, the apparatus 10 is able to distinguish between the occupancy of the equipment by a mobile object (i.e. the person 14) versus an immobile one.

Figure 2:
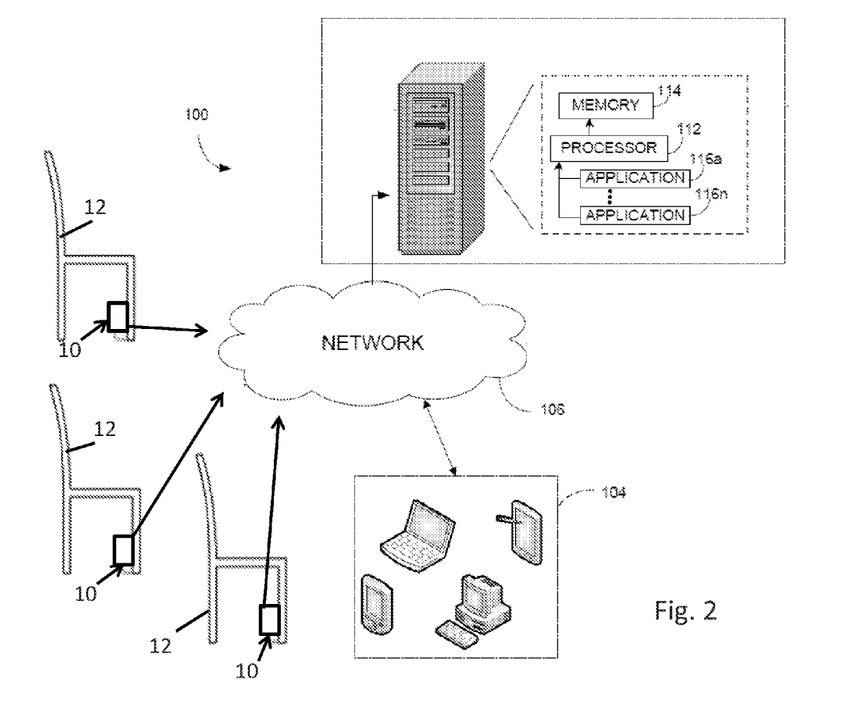
FIG. 2 is a schematic view of a system for detecting an occupancy of a plurality of equipment, according to another embodiment of the present disclosure.

Referring to FIG. 2, there is also provided a system 100 for detecting the occupancy of each one of a plurality of pieces of equipment 12 by a corresponding person. The system 100 may be used to detect the total occupancy of a room with the equipment 12, in real time, so that it can be known which equipment 12 are occupied or not. The system 100 includes one or more apparatuses 10, such as the one described above. Each apparatus 20 is mounted to, and removable from, a corresponding seat 12. Each of the apparatuses 10 has its own address which allows the system 100 to identify it, and to associate it with the seat 12 to which it is mounted. The system 100 also has a system memory 114, a system processor 112, and one or more applications 116 stored in the system memory 114 which run on the system processor 112.

The system memory 114 stores the status of each of the equipment 12 as being either occupied or unoccupied by a corresponding person. As the status of any one of the equipment 12 changes, the system memory 114 can be rewritten or modified to reflect the changed occupancy of the equipment 12. The system memory 114 may therefore be a main memory, such as a high speed Random Access Memory (RAM), or an auxiliary storage unit, such as a hard disk, a floppy disk, or a magnetic tape drive. The system memory 114 may be any other type of memory, or optical storage media such as a videodisc and a compact disc.

The system processor 112 executes the functions of the system 100, and more particularly, of the applications 116 stored in the system memory 114. The system processor 112 is in communication with each one of the apparatuses 10, via a suitable transmitting unit or system transceiver. The system processor 112 can therefore receive from each of the apparatuses 10 the occupied signals and unoccupied signals that their processors emit. The system processor 112 may also emit instructions to one or more of the processors of each of the apparatuses 10. For example, the system processor 112 can command all of the apparatuses 10 to change the status of their equipment to unoccupied. This can be done at the end of a lecture, or at the end of a meeting. The system processor 112 may send signals to deactivate one or more apparatuses 10. The system processor 112 may also configure each of the apparatuses 10, so as to provide them for example with the acceleration limit value, the consecutive number N of acceleration values, and the frequency at which the acceleration values are measured, to name only a few inputs.

The system processor 112 may communicate directly with the apparatuses 10, or indirectly via a server or other network 106, such as the Internet, a cellular network, Wi-Fi, or others. Furthermore, the system 100 may have a signal concentrator in communication with the apparatuses 10 and with the system processor 112. The signal concentrator may aggregate or concentrate the occupied and unoccupied signals emitted by the apparatuses 10, and then relay this concentrated signal data to the system processor 112. Any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol).

The one or more applications 116 are executable on the system processor 112. It should be understood that while the applications 116 presented herein are illustrated and described as separate entities, they may be combined or separated in a variety of ways. One or more of the occupied and unoccupied signals emitted from each apparatus 10 is received by the application 116. This information is indicative of a change in the status of the seat 12. The application 116 will therefore modify the system memory 114 to change the status of each of the equipment 12 as a result of the occupied or unoccupied signal received from a corresponding apparatus 10. For example, if an apparatus 10 sends an unoccupied signal, the application 116 will rewrite the entry in the system memory 114 for the corresponding seat 12 so that its status is indicated as unoccupied. The application 16 then outputs seat occupancy data. The seat occupancy data is indicative of the changed status of each of the equipment 12 stored in the modified system memory 114. The seat occupancy data can therefore help managers of public spaces to assess the popularity of each room, how frequently it is used, its average rate of occupancy, and much more.

The system 100 can have one or more output devices 104. These output devices 104 are in communication with the system processor 112, via the network 106 if necessary. The output devices 104 can be a portable or a stationary device 104. These output devices 104 can include, but are not limited to, a wall-mounted display monitor, a smartphone, a desktop or laptop computer, and a tablet. Each output device 104 displays the seat occupancy data as a graphical representation of the status of each of the equipment. It will be appreciated that the seat occupancy data can be provided in a non-graphical format, such as lists of data, a table, etc.

Figure 3:
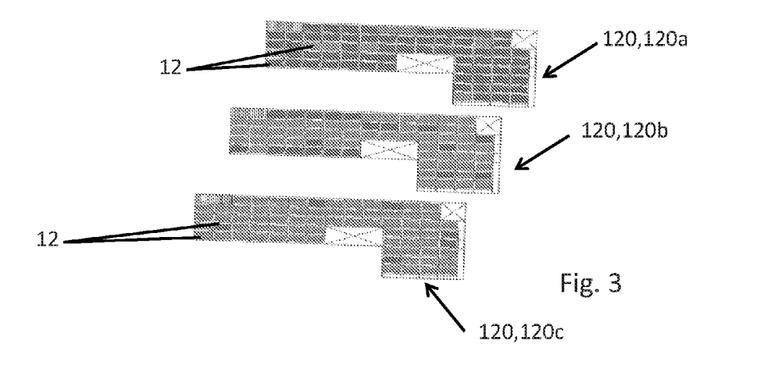
FIG. 3 is a schematic representation of seat occupancy data outputted by the system of FIG. 2.

FIG. 3 provides one of many possible graphical representations of the seat occupancy data. The occupancy of the equipment 12, and thus of the room itself, is represented graphically with a seating chart 120. The occupancy of each seat 12 is represented by a colour. For example, the darker shading indicates that the seat 12 is occupied, whereas the lighter shading indicates that the seat 12 in unoccupied. As the status of each seat 12 changes in the room, so too will its colour in the seating chart 120. Symbols or other visual indicators can be used instead of colours to indicate the occupancy of any one of the equipment 12. The seating chart 120 evolves as the room empties or fills with people.

Consider the first seating chart 120a. Most of the equipment 12 have darker shading, indicating that most of the equipment 12 in the room are occupied. As the people begin to leave the room, the information displayed on the seating chart 120a will change. This is shown in seating chart 120b, which shows a greater number of equipment 12 with lighter shading than in seating chart 120a. Seating chart 120b therefore indicates that more people have left the equipment 12, and the room is therefore becoming more empty. Seating chart 120c shows the room in an almost empty state. More particularly, the vast majority of the equipment 12 have a lighter shading which indicates that these equipment are empty. Each output device 104 therefore allows the occupancy of the equipment 12 and of the room to be known prior to entering the room. They may therefore allow for the room to be used more efficiently. They may also allow for one or more equipment to be reserved in advance.

Figure 4:
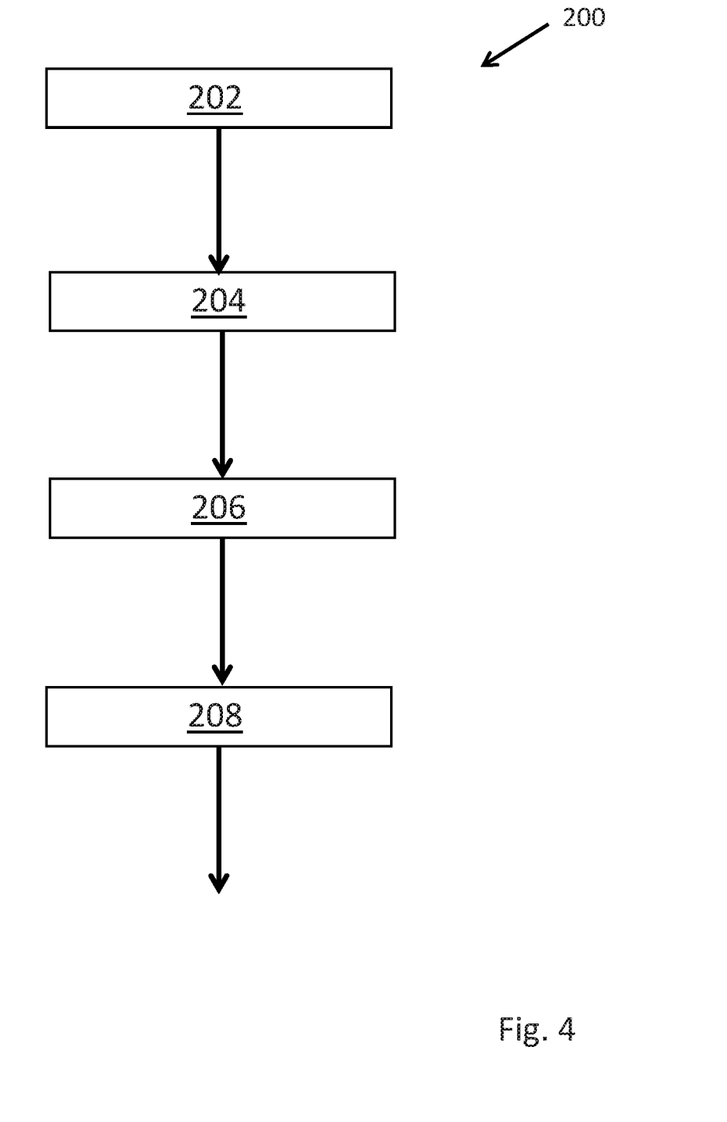
FIG. 4 is a block diagram of a method for detecting an occupancy of an equipment by a person, according to yet another embodiment of the present disclosure.

Referring to FIG. 4, there is also a method 200 for detecting an occupancy of an equipment by a person. The method 200 includes measuring an acceleration of at least a part of the seat at each of a plurality of discrete time intervals with an accelerometer unit, represented by 202 in FIG. 4. The method 200 also includes comparing in the accelerometer unit the measured accelerations to a predetermined acceleration limit value, represented by 204 in FIG. 4. The method 200 also includes emitting a movement signal with the accelerometer unit to a processor, represented as 206 in FIG. 4. The emission of the movement signal occurs upon a consecutive number N of the measured accelerations being greater than or equal to the acceleration limit value. The method 200 also includes exiting the processor from an inactive mode, represented by 208 in FIG. 4. The processor exits the inactive mode upon receiving the movement signal, and emits an occupied signal if a current status of the seat is unoccupied.

In light of the preceding, it can be appreciated that the apparatus 10, system 100 and method 200 disclosed herein allow for the occupancy of an equipment and/or room to be detected for a significant amount of time. More particularly, the power source has significant longevity because the apparatus 10, system 100 and method 200 do not require a continuous recording or processing of the movement data generated by the accelerometer unit. Indeed, it has been observed that continuous analysis and recording of the acceleration values reduces the longevity of the apparatus to only few days. This would not be commercially acceptable. By not analysing the acceleration values, and by keeping the processor inactive until only meaningful movement occurs, the longevity of the apparatus 10 is increased significantly to one or more years.

The apparatus 10, system 100 and method 200 may therefore help to control the costs associated with managing shared spaces. By some estimates, each seat at a work post can cost thousands of dollars a year to support due to costs associated with rent, heating, electricity, etc., but excluding the salary of the person at that work post. The apparatus 10, system 100 and method 200 help to detect and thus understand the occupancy of that work post, thereby helping to control the costs associated thereto.

The apparatus 10, system 100 and method 200 also helps to improve the reliability of the seat occupancy data produced. By sampling the movement of an equipment continuously by measuring acceleration values, but only raising an alert when those values are indicative of meaningful movement, the apparatus 10, system 100 and method 200 helps to eliminate false positives from the data outputted.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An apparatus for detecting an occupancy of an equipment by a person, the apparatus comprising:
a memory having stored therein a status of the equipment as either occupied or unoccupied by the person, and a predetermined acceleration limit value;
an accelerometer unit in communication with the memory, the accelerometer unit in operation, continuously measuring an acceleration value of the equipment at each of a plurality of discrete time intervals, the accelerometer unit accessing the acceleration limit value from the memory and comparing each acceleration value thereto, the accelerometer unit generating a movement signal indicative of a movement of the equipment upon a consecutive number N of the acceleration values being greater than or equal to the acceleration limit value;
a processor in communication with the accelerometer unit and with the memory, the processor operable between an active mode upon receiving the movement signal from the accelerometer unit and an inactive mode, the processor in the active mode accessing the status of the equipment from the memory and emitting an occupied signal if the previous status of the equipment is unoccupied; and
a power source supplying electrical power to the accelerometer unit and to the processor.

2. The apparatus of claim 1, wherein the processor is operable by default in the inactive mode.

3. The apparatus of claim 1, wherein the processor in the active mode accesses the status of the equipment from the memory and initiates a countdown if the status of the equipment is occupied, and then returns to the inactive mode.

4. The apparatus of claim 3, wherein the processor enters the active mode and reinitiates the countdown upon receiving at least one movement signal before the countdown has reached zero, and then returns to the inactive mode.

5. The apparatus of claim 3, wherein the processor enters the active mode and emits an unoccupied signal if the processor does not receive another movement signal from the accelerometer unit for a duration greater than the countdown.

6. The apparatus of claim 5, wherein the processor stores in the memory the status of the equipment as unoccupied upon emitting the unoccupied signal.

7. The apparatus of claim 1, wherein the accelerometer unit measures each acceleration value without communicating with the processor.

8. The apparatus of claim 1, wherein the processor stores in the memory the status of the equipment as occupied upon emitting the occupied signal, and wherein the processor returns to the inactive mode upon emitting the occupied signal or the unoccupied signal.

9. The apparatus of claim 1, wherein the accelerometer unit measures at least one acceleration value having an absolute value greater than zero upon the person sitting on, or getting up from, the equipment.

10. The apparatus of claim 1, wherein the processor enters the active mode and accesses the status of the equipment from the memory, the processor initiating a test countdown if the status of the equipment is occupied and returning to the inactive mode, the processor emitting an unoccupied signal if the processor does not receive another movement signal from the accelerometer unit for a duration greater than the test countdown.

11. The apparatus of claim 1, further comprising a body housing at least one of the memory, the accelerometer unit, the processor and the power source, the body being mountable to the equipment.

12. A system for detecting an occupancy of a plurality of equipment by people, comprising:
at least one apparatus each mountable to a corresponding equipment, comprising:
a memory having stored therein a status of said equipment as either occupied or unoccupied by a person, and a predetermined acceleration limit value;
an accelerometer unit in operation measuring an acceleration value of said equipment at each of a plurality of discrete time intervals, the accelerometer unit accessing the acceleration limit value from the memory and comparing each acceleration value thereto, the accelerometer unit continuously measuring acceleration and generating a movement signal indicative of a movement of said equipment upon a consecutive number N of the acceleration values being greater than or equal to the acceleration limit value;
a processor in communication with the accelerometer unit and with the memory, the processor operable between an active mode upon receiving the movement signal from the accelerometer unit and an inactive mode, the processor in the active mode accessing the status of said equipment from the memory and emitting an occupied signal if the status of said equipment is unoccupied; and
a power source supplying electrical power to the accelerometer unit and to the processor;
a system memory having stored therein the status of each of the equipment as either occupied or unoccupied by a corresponding person;
a system processor in communication with each apparatus to receive the occupied signal and an unoccupied signal therefrom; and
at least one application stored in the system memory, and executable by the system processor to:
receive the occupied and unoccupied signals from each apparatus;
modify the system memory to change the status of each of the equipment as a result of the occupied or unoccupied signal received from a corresponding apparatus; and
output equipment occupancy data indicative of the changed status of each of the equipment stored in the modified system memory.

13. The system of claim 12, wherein the equipment occupancy data is a graphical representation of the changed status of each of the equipment.

14. The system of claim 13, further comprising an output device in communication with the system processor, the output device displaying the graphical representation of the changed status of each of the equipment.

15. A method for detecting an occupancy of an equipment by a person, comprising:
measuring an acceleration of at least a part of the equipment at each of a plurality of discrete time intervals with an accelerometer unit;
comparing in the accelerometer unit the measured accelerations to a predetermined acceleration limit value;
emitting a movement signal with the accelerometer unit to a processor upon a consecutive number N of the measured accelerations being greater than or equal to the acceleration limit value; and
exiting the processor from an inactive mode upon receiving the movement signal and emitting an occupied signal with the processor if a current status of the equipment is unoccupied.

16. The method of claim 15, wherein exiting the processor from the inactive mode includes initiating a countdown if the current status of the equipment is occupied, and returning to the inactive mode.

17. The method of claim 16, wherein exiting the processor from the inactive mode includes reinitiating the countdown upon receiving at least one movement signal before the countdown has reached zero.

18. The method of claim 16, wherein initiating the countdown includes emitting an unoccupied signal with the processor if the processor does not receive another movement signal from the accelerometer unit for a duration greater than the countdown, and returning to the inactive mode.

19. The method of claim 18, wherein emitting the unoccupied signal includes changing the status of the equipment to unoccupied.

20. The method of claim 15, wherein exiting the processor from the inactive mode includes changing the status of the equipment to occupied.

* * * * *